US012792931B2

(12) United States Patent
Ravishankar et al.

(10) Patent No.: US 12,792,931 B2
(45) Date of Patent: Nov. 10, 2026

(54) SEMANTICALLY PARSED KNOWLEDGE BASE QUESTION ANSWERING GENERALIZATION

(71) Applicant: International Business Machines Corporation, Armonk, NY (US)

(72) Inventors: Srinivas Ravishankar, White Plains, NY (US); Dung Ngoc Thai, Madison, WI (US); Ibrahim Abdelaziz, Tarrytown, NY (US); Pavan Kapanipathi Bangalore, White Plains, NY (US); Tahira Naseem, Briarcliff Manor, NY (US); Achille Belly Fokoue-Nkoutche, White Plains, NY (US); Nandana Mihindukulasooriya, Cambridge, MA (US)

(73) Assignee: International Business Machines Corporation, Armonk, NY (US)

(*) Notice: Subject to any disclaimer, the term of this patent is extended or adjusted under 35 U.S.C. 154(b) by 1068 days.

(21) Appl. No.: 17/930,288

(22) Filed: Sep. 7, 2022

(65) Prior Publication Data

US 2024/0078443 A1 Mar. 7, 2024

(51) Int. Cl.
*G06N 5/022* (2023.01)

(52) U.S. Cl.
CPC .................................... *G06N 5/022* (2013.01)

(58) Field of Classification Search
CPC ...................................................... G06N 5/022
See application file for complete search history.

(56) References Cited

U.S. PATENT DOCUMENTS 9,406,020 B2 8/2016 Arroyo
10,108,700 B2 * 10/2018 Gupta .................... G06N 5/025
2022/0318593 A1 * 10/2022 Chen ........................ G06N 3/04
2023/0376841 A1 * 11/2023 Le ......................... G06F 40/284

FOREIGN PATENT DOCUMENTS

CN 113792541 A * 12/2021 ......... G06F 18/2415

OTHER PUBLICATIONS

Kapanipathi et al. (Leveraging Abstract Meaning Representation for Knowledge Base Question Answering, published Jun. 2, 2021) (Year: 2021).*
Kocijan et al. (Knowledge Base Completion Meets Transfer Learning, published 2021) (Year: 2021).*
Yin et al. (Neural Machine Translating from Natural Language to SPARQL, published 2019) (Year: 2019).*
Lewis et al. (BART: Denoising Sequence-to-Sequence Pre-training for Natural Language Generation, Translation, and Comprehension, published 2019) (Year: 2019).*
Cai et al., "An Encoder-Decoder Framework Translating Natural Language to Database Queries", arXiv:1711.06061v2 [cs.CL] Jun. 9, 2018, 8 pages.

(Continued)

*Primary Examiner* — David Yi
*Assistant Examiner* — Syed Rayhan Ahmed
(74) *Attorney, Agent, or Firm* — Harrity & Harrity, LLP

(57) ABSTRACT

One or more computer processors improve knowledge base question answering (KBQA) model convergence and prediction performance by generalizing the KBQA model based on transfer learning.

17 Claims, 10 Drawing Sheets

(56) References Cited

OTHER PUBLICATIONS

Chen et al. "ReTraCk: A Flexible and Efficient Framework for Knowledge Base Question Answering", In Proceedings of the 59th Annual Meeting of the Association for Computational Linguistics and the 11th International Joint Conference on Natural Language Processing: System Demonstrations, (Aug. 2021), 12 pages.
Diefenbach et al., "WDAqua-core0: A Question Answering Component for the Research Community", SWC 2017, May 2017, 6 pages.
Gu et al., "Beyond IID: Three Levels of Generalization for Question Answering on Knowledge Bases", arXiv:2011.07743v6 [cs.CL] Feb. 22, 2021, 12 pages.
Kapanipathi et al., "Leveraging abstract meaning representation for knowledge base question answering", arXiv:2012.01707v2 [cs.CL] Jun. 2, 2021, 11 pages.
Kocijan et al., "Knowledge Base Completion Meets Transfer Learning", arXiv:2108.13073v1 [cs.CL] Aug. 30, 2021, 13 pages.
Ravishankar et al., "A Two-Stage Approach towards Generalization in Knowledge Base Question Answering", Grace Period Disclosure, arXiv:2111.05825v2 [cs.CL] Nov. 17, 2021, 9 pages.
Sakor et al., "Falcon 2.0: An Entity and Relation Linking Tool over Wikidata", arXiv:1912.11270v7 [cs.CL] Aug. 31, 2020, 8 pages.
Sen et al., "Athena++ Natural Language Querying for Complex Nested SQL Queries", Proceedings of the VLDB Endowment, 2020, 13 pages, <https://doi.org/10.14778/3407790.3407858>.
Sun et al., "Faithful Embeddings for Knowledge Base Queries", arXiv:2004.03658v3 [cs.LG] Jan. 29, 2021, 17 pages.
Sun et al., "Open Domain Question Answering Using Early Fusion of Knowledge Bases and Text", arXiv:1809.00782v1 [cs.CL] Sep. 4, 2018, 12 pages.
Vakulenko et al., "Message Passing for Complex Question Answering over Knowledge Graphs", arXiv:1908.06917v1 [cs.CL] Aug. 19, 2019, 10 pages.
Yin et al., "Neural Machine Translating from Natural Language to SPARQL", arXiv:1906.09302v1 [cs.CL] Jun. 21, 2019, 17 pages.

* cited by examiner

300

| KG | Query Graph Structure |
|---|---|
| DBpedia | ?var <director> <entity><br>?var <language> ?ans |
| Wikimovies | ?var <directed by> <entity><br>?var <In language> ?ans |
| Wikidata | ?var <director> <entity><br>?var <original language of film> ?ans |

FIG. 3

400

```
SELECT ?var0 WHERE {
        ?var1 :prop0 :ent0   .
        ?var1 :prop1 ?var0   .
    }
```

FIG. 4

600

```
P=0.87      SELECT ?var0 where {
                ?var director :ent0.
                ?var1 language ?var0.}
P=0.76      SELECT?var0 where {
                ?var1 director :ent0.
                ?var1 languages ?var0.}
    . . .
```

FIG. 6

700

| KG | KG Relation | Derived Surface Form |
|---|---|---|
| DBpedia | dbo:language<br>dbp: language<br>dbp: languages | language<br>language<br>languages |
| Wikidata | P397<br>P364 | official language<br>original language of film or TV show |
| FreeBase | people.ethnicity.languages_spoken<br>location.country.languages_ spoken | languages spoken<br>languages spoken |

FIG. 7

800

| Rank | Predicted Query |
|---|---|
| 1 | SELECT ?var0 where { ?var1 dbo:director dbr:John Director. ?var1 dbo: language ?var0 . } |
| 1 | SELECT ?var0 where { ?var1 dbp:director dbr:JohnDirector. ?var1 dbo: language ?var0. } |
| 2 | SELECT ?var0 where { ?var1 dbo:director dbr:John Director. ?var1 dbp: languages ?var0. } |
| 2 | SELECT ?var0 where { ?var1 dbp:director dbr:John Director. ?var1 dbp: languages ?var0. } |

FIG. 8

900

| | KG | Train | Valid | Test |
|---|---|---|---|---|
| LC-QuAD 1.0 | DBpedia | 3,650 | 200 | 1,000 |
| Simple Question | Wikidata | 15,000 | 2,000 | 2,280 |
| WQSP-FB | Freebase | 2898 | 200 | 1,596 |
| MetaQA 1-hop | Wikimovies | 86,470 | 9,992 | 9,947 |
| Meta@A 2-hop | Wikimovies | 118,980 | 14,872 | 14,872 |
| Meta0A 3-hop | Wikimovies | 114,196 | 14,274 | 14,274 |

FIG. 9

1100

| | SimpleQuestions-Wiki | | | LC-QuAD 1.0 | | | WebQSP | MetaQA | | |
|---|---|---|---|---|---|---|---|---|---|---|
| System | P | R | F1 | P | R | F1 | Hits@1 | Hits@1 1-Hop | Hits@1 2-Hop | Hits@1 3-Hop |
| WDAqua | - | - | - | 22.0 | 38.0 | 28.0 | - | - | - | - |
| QAMP | - | - | - | 25.0 | 50.0 | 33.0 | - | - | - | - |
| NSQA | - | - | - | 44.8 | 45.8 | 44.4 | - | - | - | - |
| Falcon 2.0 | 34 | 41.1 | 36.3 | - | - | - | - | - | - | - |
| GraftNet | - | - | - | - | - | - | 70.3 | 97.0 | 99.9 | 91.4 |
| PullNet | - | - | - | - | - | - | 69.7 | 97.0 | 99.9 | 91.4 |
| EmbedKGQA | - | - | - | - | - | - | 66.6 | 97.5 | 98.8 | 94.8 |
| EMQL | - | - | - | - | - | - | 75.5 | - | 98.6 | 99.1 |
| STaG-QA | 59.4 | 62.7 | 61.0 | 76.5 | 52.8 | 51.4 | 65.9 | 100.0 | 100.0 | 99.9 |
| STaG-QA$_{pre}$ | 60.2 | 63.2 | 61.7 | 74.5 | 54.8 | 53.6 | 68.5 | 100.0 | 100.0 | 100.0 |

FIG. 11

1200

| Dataset | # of questions with unseen paths |
|---|---|
| LC-QuAD 1.0 | 490/1,000 (49 %) |
| WebQSP | 45/1,638 (2 %) |
| MetaQA 2-hop | 0/14,872 (0 % ) |
| MetaQA 3-hop | 0/14,274 (0 %) |

FIG. 12

1300

| System | 2-Hop Seen | 2-hop Unseen |
|---|---|---|
| EmbedKGQA | 99.00 | 50.00 |
| GraftNet-KB | 97.90 | 75.2 |
| GraftNet-Text | 51.2 | 43.3 |
| Graft Net-Both | 99.13 | 95.41 |
| STaG-QA | 99.9 | 99.7 |

FIG. 13

SEMANTICALLY PARSED KNOWLEDGE BASE QUESTION ANSWERING GENERALIZATION

STATEMENT REGARDING PRIOR DISCLOSURES BY THE INVENTOR OR A JOINT INVENTOR

The following disclosure is submitted under 35 U.S.C. 102(b)(1)(A):

(i) A Two-Stage Approach towards Generalization in Knowledge Base Question Answering; Srinivas Ravishankar, June Thai, Ibrahim Abdelaziz, Nandana Mihidukulasooriya, Tahira Naseem, Pavan Kapanipathi, Gaetano Rossiello, and Achille Fokoue; Nov. 10, 2021.

BACKGROUND

The present invention relates generally to the field of machine learning, and more particularly to knowledge base question answering.

Knowledge base question answering (KBQA) aims to answer a natural language question over a knowledge base (KB) as its knowledge source. A knowledge base (KB) is a structured database that contains a collection of facts.

SUMMARY

Embodiments of the present invention disclose a computer-implemented method, a computer program product, and a system. The computer-implemented method includes one or more computer processers improving knowledge base question answering model convergence and prediction performance by generalizing the model based on transfer learning.

BRIEF DESCRIPTION OF THE DRAWINGS

Figure (i.e., FIG.) 1 is a functional block diagram illustrating a computing environment, in accordance with an embodiment of the present invention;

FIG. 3 is a table containing an exemplary query, in accordance with an embodiment of the present invention;

FIG. 4 is an exemplary SPARQL skeleton, in accordance with an embodiment of the present invention;

FIG. 6 is an exemplary SPARQL skeleton, in accordance with an embodiment of the present invention;

FIG. 7 is a table containing exemplary textualized relations, in accordance with an embodiment of the present invention;

FIG. 8 is a table containing exemplary SPARQL queries, in accordance with an embodiment of the present invention;

FIG. 9 is a table containing dataset statistics, in accordance with an embodiment of the present invention;

FIG. 11 is a table containing performance results, in accordance with an embodiment of the present invention;

FIG. 12 is a table containing testing results, in accordance with an embodiment of the present invention;

FIG. 13 is a table containing testing results, in accordance with an embodiment of the present invention.

DETAILED DESCRIPTION

Figure 1:
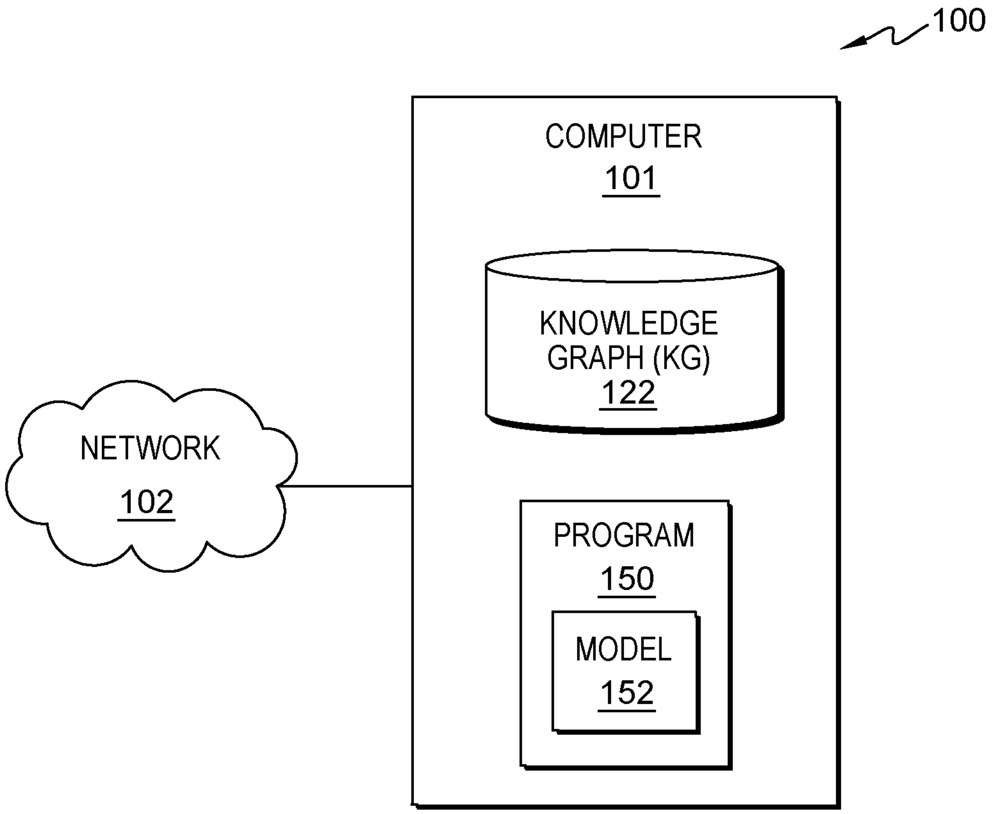

Knowledge Base Question Answering (KBQA) has gained significant popularity in recent times due to its real-world applications (e.g., natural language processing), facilitating access to rich Knowledge Graphs (KGs) without the need for technical query-syntax. Given a natural language question, a KBQA system is required to find an answer based on the facts available in the KG. For example, given the question "Who is the director of this film", a KBQA system should retrieve the entity corresponding to "Fictional Director". Existing approaches for KBQA focus on a specific underlying knowledge base either due to inherent assumptions in the approach, or evaluating on a different knowledge base requires non-trivial changes. However, many popular knowledge bases (KBs) or knowledge graphs (KGs) share similarities in corresponding underlying schemas that can be leveraged to facilitate generalization across knowledge bases. Existing heuristic based KBQA approaches are typically tuned for a specific underlying knowledge base making it difficult and computational expensive to generalize and adapt the KBQA to other KGs. On the other hand, systems that only focus on generalizability, ignore question syntax, thereby reducing performance on datasets with complex multi-hop questions.

There is a need for end-to-end learning approaches that are not tied to specific KGs or heuristics which generalize to multiple KGs, in particular categorized different forms of generalization such as novel relation compositionality and zero-shot generalization. Prior implementations have demonstrated learning or knowledge transfer across QA datasets, but only within the same KG. Said implementations are highly sensitive to the training data; failing to generalize in terms of relation compositionality within a KG. Further, said implementations show significant drops (between 23-50%) in performance on relation compositions that are not seen during training.

The present invention is a novel, generalizable KBQA approach called STaG-QA (Semantic parsing for Transfer and Generalization) that facilitates generalization across KBs or KGs despite tight-integrations with KG-specific embeddings through a 2-stage architecture that explicitly separates semantic parsing from knowledge base interaction. Embodiments of the present invention generalize KBQA systems or models by transfer learning between disparate QA dataset/KG pairs, where the generalized transfer learning provides significant performance gains while reducing sample complexity. This embodiment provides greater predictive performance in low-resource environments (i.e., scarcity of training data for a new target KG). Embodiments of the present invention provide zero-shot transfer learning across disparate knowledge graphs with improved performance (e.g., ability to converge quicker). Embodiments of the present invention facilitate transfer learning across datasets and knowledge graphs.

Embodiments of present invention have two stages: 1) a generative model that predicts a query skeleton, comprised SPARQL operators, and partial relations based on label semantics that can be generic to most knowledge graphs; 2) converting the output of the first stage to a final query that includes entity and relations mapped to a specific KG to retrieve a final answer. Embodiments of the present invention work seamlessly with multiple KGs and demonstrates transfer even across QA datasets with different underlying KGs. Embodiments of present invention are the first to evaluate on and achieve state-of-the-art or comparable performance on KBQA datasets. Embodiments of present invention demonstrate extensive experimental results: (a) facilitation of knowledge transfer with significant performance gains in low-resource settings; and (b) generalization of the present invention improves prediction performance (23-50%) to unseen relation combinations in comparison to prior approaches, as discussed in the Figures. Embodiments of present invention show that pretraining on datasets with a different underlying knowledge base provides significant performance gains and reduces sample complexity. Embodiments of the present invention recognize that multi-hop patterns are generic to question answering over KGs and across many KGs, analogous relations have semantic or lexical overlap. Implementation of embodiments of the invention may take a variety of forms, and exemplary implementation details are discussed subsequently with reference to the Figures.

The present invention will now be described in detail with reference to the Figures.

FIG. 1 is a functional block diagram illustrating a computing environment, generally designated 100, in accordance with one embodiment of the present invention. The term "computing" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes computer 101 connected over network 102. Network 102 can be, for example, a telecommunications network, a local area network (LAN), a wide area network (e.g., WAN 1402), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between computer 101, and other computing devices (not shown) within computing environment 100. In various embodiments, network 102 operates locally via wired, wireless, or optical connections and can be any combination of connections and protocols (e.g., personal area network (PAN), near field communication (NFC), laser, infrared, ultrasonic, etc.).

Computer 101 can be a standalone computing device, a management server, a web server, a mobile computing device, or any other electronic device or computing system capable of receiving, sending, and processing data. In other embodiments, computer 101 can represent a server computing system utilizing multiple computers as a server system, such as in a cloud computing environment. In another embodiment, computer 101 can be a laptop computer, a tablet computer, a netbook computer, a personal computer (PC), a desktop computer, a personal digital assistant (PDA), a smart phone, or any programmable electronic device capable of communicating with other computing devices (not shown) within computing environment 100 via network 102. In another embodiment, computer 101 represents a computing system utilizing clustered computers and components (e.g., database server computers, application server computers, etc.) that act as a single pool of seamless resources when accessed within computing environment 100. In the depicted embodiment, computer 101 includes knowledge graph 122 and program 150. In other embodiments, server computer 120 may contain other applications, databases, programs, etc. which have not been depicted in computing environment 100. Computer 101 may include internal and external hardware components, as depicted, and described in further detail with respect to FIG. 14.

Knowledge graph (KG) 122 and knowledge base (KG) are repositories for data used by program 150. In the depicted embodiment, KG 122 resides on computer 101. In another embodiment, KG 122 may reside elsewhere within computing environment 100 provided program 150 has access to KG 122. A database is an organized collection of data. KG 122 can be implemented with any type of storage device capable of storing data and configuration files that can be accessed and utilized by program 150, such as a database server, a hard disk drive, or a flash memory. In an embodiment, KG 122 stores data used by program 150, such as a plurality of datasets with pairs of questions attached with a corresponding query (e.g., SPARQL). For example, KG 122 includes LC-QuAD 2.0 is a large question answering dataset with 30,000 pairs of questions and corresponding queries. In another example, KG 122 includes DBpedia comprised of extracted, structured content from online encyclopedia. In another example, KG 122 includes Wikimovies comprised of 100,000 questions in a movie domain. In yet another example, KG 122 includes Wikidata comprised of central storage for structured data of a plurality of online encyclopedias.

Program 150 is a program for semantic parsing for transfer and generalization (STaG-QA) of knowledge base question answering. In various embodiments, program 150 may implement the following steps: improve knowledge base question answering (KBQA) model convergence and prediction performance by generalizing the KBQA model based on transfer learning. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on any other computing device (not depicted) within computing environment 100. In the depicted embodiment, program 150 includes model 152. Program 150 is depicted and described in further detail with respect to FIG. 2.

Figure 5:
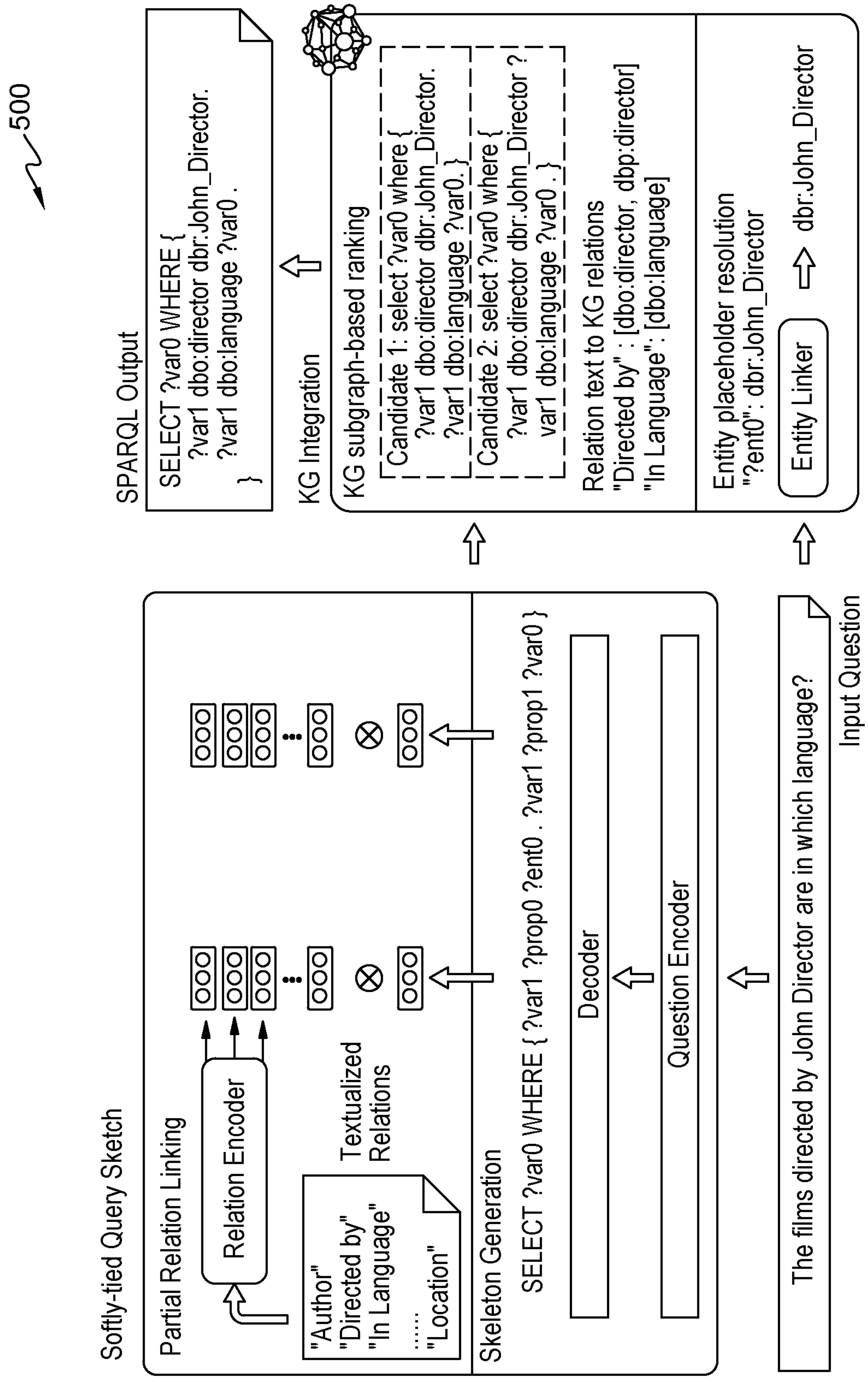
FIG. 5 illustrates operational steps of a program within the computing environment of FIG. 1, in accordance with an embodiment of the present invention.

Model 152 is representative of a transformer based (SEQ2SEQ) model, trained to produce the query skeleton corresponding to a question text, as depicted in FIG. 5. Model 152 is comprised of an encoder and decoder, where the encoder is a bi-direction transformer, while the decoder is auto-regressive with a causal self-attention mask. In an embodiment, responsive to the question text, program 150 tokenizes said text using bidirectional encoder representations from a transformer (e.g., bidirectional encoder representations from transformers (BERT)) tokenizer and adding special [CLS] and [SEP] symbols in the beginning and the end of the question, respectively. Responsively, program 150 passes the tokenized input is through a model 152, producing encoder hidden states for each token at each layer. In this embodiment, program 150 initializes the encoder with a pretrained BERT model, helping generalization with respect to different question syntax. In another embodiment, responsively, program 150 utilizes a transformer decoder with a cross attention mechanism, where at each time step i, the decoder considers encoder states via cross-attention and previous decoder states via self-attention. In this embodiment, program 150 then produces a distribution over possible skeleton output tokens. The decoder output vocabulary V comprises of entity place holder tokens $V_e$, relation place holder tokens $V_r$, and SPARQL operators $V_o$; each of these is a small, closed set of tokens. The output of each decoding step is a SoftMax over possible operators $s_i \in V$. Unlike the encoder, no pre-trained model is used for the decoder, and parameters are initialized randomly. The training of model 152 is depicted and described in further detail with respect to FIG. 2.

The present invention may contain various accessible data sources, such as KG 122, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
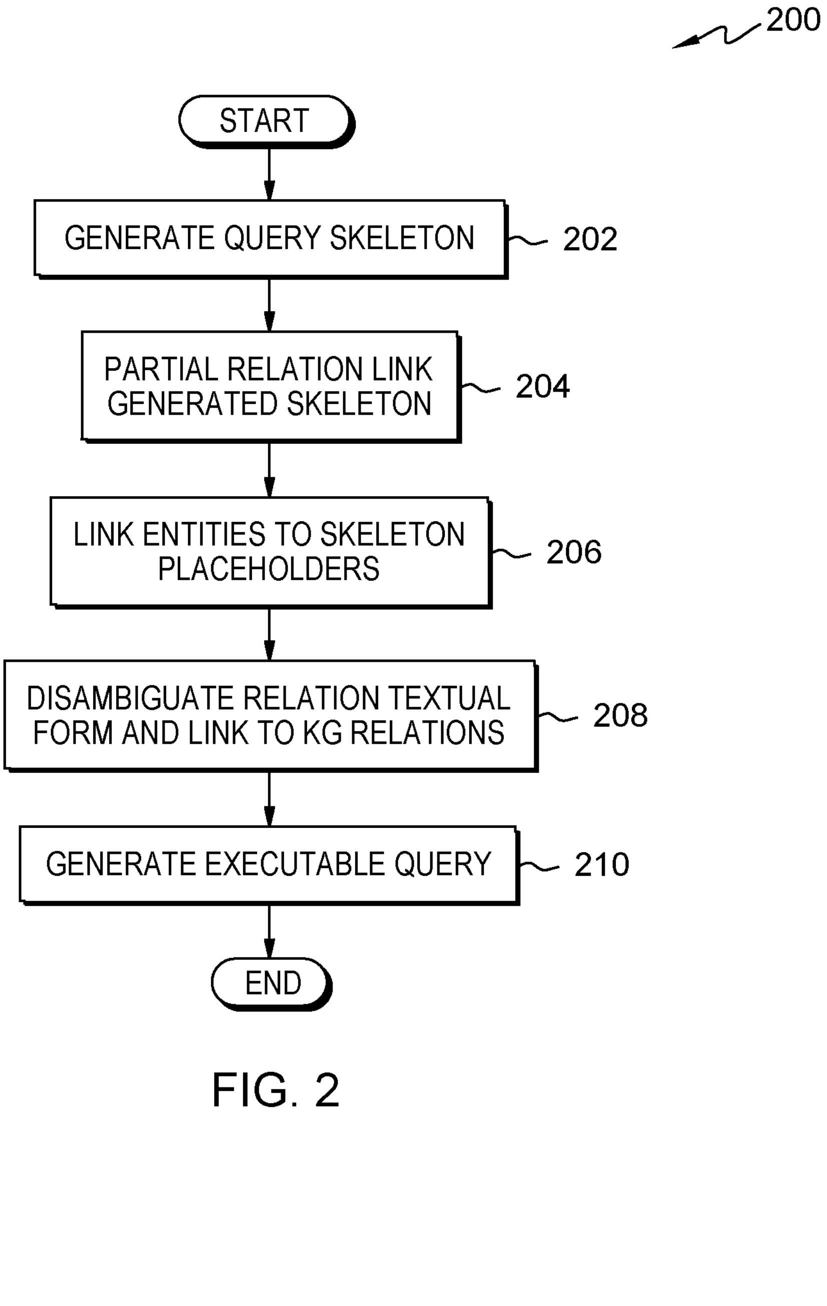
FIG. 2 is a flowchart depicting operational steps of a program, on a computer within the computing environment of FIG. 1, for semantic parsing for transfer and generalization (STaG-QA) of knowledge base question answering, in accordance with an embodiment of the present invention.

FIG. 2 depicts flowchart 200 illustrating operational steps of program 150 for semantic parsing for transfer and generalization (STaG-QA) of knowledge base question answering, in accordance with an embodiment of the present invention.

Program 150 generates a query skeleton (step 202). In an embodiment, program 150 initiates responsive to a new KG or a training request for model 152. In another embodiment, program 150 initiates responsive to an inputted or retrieved question. In an embodiment, program 150 generates the skeleton (e.g., SPARQL query skeleton) to capture one or more operators (i.e., ASK, SELECT, COUNT or FILTER) required to answer the question. In a further embodiment, the SPARQL skeleton captures a query graph structure with placeholder nodes for entities (e.g., :ent0), relations (e.g., :prop0), and variables (e.g., ?var0). For many questions, program 150 generated SPARQL skeletons across different KGs are similar, if not identical. In an embodiment, program 150 structures the skeleton uniquely to a KG, where reification is learnt when fine-tuning on a dataset with that underlying KG. An example of a SPARQL skeleton is demonstrated in FIG. 4 for the question "The films directed by John Director are in which language?".

As shown in FIG. 5, program 150 passes the question through model 152 trained to produce the SPARQL skeleton corresponding to the question text. The encoder of the model 152 is a bi-direction transformer, while the decoder is auto-regressive with a causal self-attention mask. In an embodiment, responsive to a question text, program 150 tokenizes said text using bidirectional encoder representations from transformers (BERT) tokenizer and adding special [CLS] and [SEP] symbols in the beginning and the end of the question, respectively. Responsively, program 150 passes the tokenized input is through a transformer encoder, producing encoder hidden states for each token at each layer. In this embodiment, program 150 initializes the encoder with a pretrained BERT model, helping generalization with respect to different question syntax.

In another embodiment, responsively, program 150 utilizes a transformer decoder with a cross attention mechanism, where at each time step i, the decoder considers encoder states via cross-attention and previous decoder states via self-attention. In this embodiment, program 150 then produces a distribution over possible skeleton output tokens. The decoder output vocabulary V comprises of entity place holder tokens $V_e$, relation place holder tokens $V_r$, and SPARQL operators $V_o$; each of these is a small, closed set of tokens. The output of each decoding step is a SoftMax over possible operators $s_i \in V$. Unlike the encoder, no pre-trained model is used for the decoder, and parameters are initialized randomly.

Program 150 partial relation links the generated skeleton (step 204). In an embodiment, responsive to each relation placeholder (:prop0, :prop1, etc.) comprised within the generated skeleton, program 150 identifies an appropriate relation that can replace the placeholder to produce a correct semantic representation of the graph query. In an embodiment, relations across KGs share lexical and semantic similarities. For example, in FIG. 3 the three KGs (DBpedia, Wikimovies, and Wikidata) represent the relationship "directed by" with very similar lexical terms "director" and "directed by". In an embodiment, program 150 leverages pre-trained language models to allow generalization and transfer of such relations across KGs. In each KG, program 150 first maps the relations to respective surface forms, using either label relations from the KG, or by extracting some semantically meaningful surface form from the relation URI. These are "textualized relations" shown in FIG. 4. FIG. 7 shows some more examples of relation labels for 3 KGs. In an embodiment, this mapping is many-to-one. For example, both dbo:language and dbp:language map to the same relation label "language".

In an embodiment, program 150 identifies which relation surface form best matches each relation placeholder in the skeleton. In a further embodiment, program 150 trains the decoder and relation encoder, within model 152, to project into the same space. In an embodiment, program 150 optimizes the decoder hidden state corresponding to each relation placeholder to be closest to the encoded representation of the correct relation, utilizing a cross-entropy loss. For example, in FIG. 4, the decoder state for :prop0 has a maximum inner product with the encoded representation for the relation surface form "Directed by", compared to the encoded representations of all other relations. In an embodiment, the relation encoder of model 152 is a transformer model whose parameters are initialized with pretrained BERT model. In this embodiment, program 150 utilizes BERT-based representations of lexically or semantically similar relations across KGs to facilitate transfer across KGs. In these embodiments, the outcome of step 204 is a ranked list of relation surface forms for each relation placeholder in the skeleton.

In a further embodiment, program 150 optimizes skeleton generation loss and partial relation linking loss, jointly. In this embodiment, program 150 utilizes the generated skeleton together with the partial relation linking to produce a ranked list of softly-tied query sketches. In the case of multiple placeholders, the score of each pair of relation surface forms is the product of their individual scores. In some embodiments, this phase produces multiple semantic interpretations, either due to noisy surface forms (for instance, DBpedia includes keys that cannot be mapped to the ontology relations) or due to the presence of semantically identical or similar relations with distinct identifiers (e.g., dbo:language and dbp:language). For the example, "The films directed by John Director are in which language?", this stage will produce the results demonstrated in FIG. 6.

Program 150 links entities to skeleton placeholders (step 206). In an embodiment, program 150 introduces vocabulary specific to the KG in order to generate an executable SPARQL query, by initially linking different entities to corresponding placeholders in the skeleton. In this embodiment, program 150 initiates a KG interaction stage to generate the executable query. In an embodiment, program 150, responsive to a list of candidate query sketches, leverages an entity linker (not depicted) to align entities with the entity place holders in the query sketch, where the entity linker provides tuples of (surface form, linked entity) pairs. In the example above, :ent0 will be linked to dbr:John_Director in DBpedia, or wd:Q313039 in Wikidata.

Responsive to multiple entities are present in the question, program 150 defines the position of the corresponding textual span as the alignment to the entity placeholder variable. In another embodiment, during training, the first entity in the question corresponds to :ent0, the second entity by :ent1, etc. This pattern is repeated by the present invention when decoding during inference, making entity placeholder resolution trivial.

Program 150 disambiguates relation textual form and links to KG relations (step 208). In an embodiment, program 150 disambiguates one or more relations, in a textual form, and links the disambiguated relations to specific KG relations. FIG. 7 shows that each surface form in a query sketch can map to one or more KG relations. In the example using DBpedia as a KG, the surface form "director" could map to both [dbo:director, dbp:director] whereas "language" could map to both [dbo:language, dbp:language]. The semantic parsing stage cannot distinguish between these, and thus program 150 relies on the KG to determine the specific relation that should be chosen. In an embodiment, program 150 replaces every relation surface form with each of the possible mapping KG relations. In this embodiment, for each softly-tied query sketch, program 150 produces one or more fully executable SPARQLs queries. For example, the 2 softly-tied sketches from the previous example and example produce 4 possible SPARQLs, see FIG. 8.

Program 150 generates SPARQL (step 210). In an embodiments, program 150 executes the candidate SPARQL queries against the KB and selects the highest-ranked SPARQL that produces an answer for SELECT queries. In this embodiment, program 150 ranks the executed queries by replacing the relation classifier with a BERT-based ranker (not depicted), leveraging similarities in label semantics between KGs. In an embodiment, program 150 ranks the candidate queries and/or query results utilizing a ranking heuristic dependent on the KG. In this embodiment, the present invention ranks all candidate graph queries or patterns retrieved from the KG based on a grounded entity. In an embodiment, responsive to a multi-hop setting, program 150 retrieves all possible candidates up to n-hops (for an arbitrary choice of n) and then program 150 ranks each candidate query. In various embodiments, program 150 ranks the candidate queries utilizing respective candidate probabilities (i.e., confidence values). In another embodiment, program 150 only considers model score when selecting ASK queries due to ASK queries do not have to be valid in the KG. In these embodiments, program 150 selects the correct SPARQL based on the actual facts in the KG. In an embodiment, program 150 returns the highest ranked answer (i.e., candidate query and/or query result) or a list of top ranked answer (i.e., based on a probability distribution), to a user. For example, program 150 returns the highest selected answer utilizing a display on a user mobile computing device.

FURTHER COMMENTS AND/OR EMBODIMENTS

Most existing approaches for Knowledge Base Question Answering (KBQA) focus on a specific underlying knowledge base either because of inherent assumptions in the approach, or because evaluating it on a different knowledge base requires non-trivial changes. However, many popular knowledge bases share similarities in corresponding underlying schemas that can be leveraged to facilitate generalization across knowledge bases.

To achieve this, the present invention introduces a KBQA framework based on a 2-stage architecture that explicitly separates semantic parsing from the knowledge base interaction, facilitating transfer learning across datasets and knowledge graphs. The present invention shows that pretraining on datasets with a different underlying knowledge base provides significant performance gains and reduces sample complexity. The present invention achieves comparable or state-of-the-art performance for KBQA.

KBQA has gained significant popularity in recent times due to its real-world applications (e.g., natural language processing), facilitating access to rich Knowledge Graphs (KGs) without the need for technical query-syntax. Given a natural language question, a KBQA system is required to find an answer based on the facts available in the KG. For example, given the question "Who is the director of this film", a KBQA system should retrieve the entity corresponding to "Fictional Director". In an embodiment, this would be dbr:Fictional_Director.

Most existing heuristic based KBQA approaches are typically tuned for a specific underlying knowledge base making it non-trivial to generalize and adapt it to other knowledge graphs. On the other hand, systems focusing on generalizable, ignore question syntax, thereby reducing performance on datasets with complex multi-hop questions.

Recently, there has been a surge in end-to-end learning approaches that are not tied to specific KGs or heuristics, and hence can generalize to multiple KGs, in particular categorized different forms of generalization, such as novel relation compositionality and zero-shot generalization. Prior implementations have also demonstrated transfer across QA datasets, but within the same KG. Said implementations are highly sensitive to the training data; failing to generalize in terms of relation compositionality within a KG. Further, said implementations show significant drops (between 23-50%) in performance on relation compositions that are not seen during training. Furthermore, it is unclear how these systems transfer across KGs because of tight-integrations with KG-specific embeddings.

The present invention is a novel generalizable KBQA approach called STaG-QA (Semantic parsing for Transfer and Generalization) that works seamlessly with multiple KGs and demonstrates transfer even across QA datasets with different underlying KGs. The present invention approach separates aspects of KBQA systems that are softly tied to the KG but generalizable, from the parts more strongly tied to a specific KG. Concretely, the present invention has two stages: 1) the first stage is a generative model that predicts a query skeleton, which includes the query pattern and comprised SPARQL operators, as well as partial relations based on label semantics that can be generic to most knowledge graphs; 2) the second stage converts the output of the first stage to a final query that includes entity and relations mapped to a specific KG to retrieve a final answer. The present invention utilizes a SEQ2SEQ architecture for KBQA that separates aspects of the output that are generalizable across KGs, from those that are strongly tied to a specific KG. The present invention is the first to evaluate on and achieve state-of-the-art or comparable performance on KBQA datasets. The present invention demonstrates extensive experimental results shows that the present invention: (a) facilitates transfer with significant performance gains in low-resource setting; (b) generalizes significantly better (23-50%) to unseen relation combinations in comparison to state-of-the-art approaches.

KBQA tasks involve finding an answer for a natural language question from a given KG. The present invention solves KBQA tasks by predicting the correct structured SPARQL query that will retrieve the required answer(s) from the KG, i.e., by estimating a probability distribution over possible SPARQL queries given the natural language question.

The present invention proposes a model architecture that generalizes across different KGs. In order to achieve this goal, the present invention utilizes 2-stage approach as shown in FIG. 5, where embodiments of the present invention separate generic SPARQL query-sketch learning from KG-specific mapping of concepts. Specifically, the following 2-stages are: softly-tied query sketch and KG alignment.

Softly-tied query sketch: This is the first stage where the present invention learns aspects of the SPARQL query generation that are generic to any knowledge graph. Specifically, the present invention observes the following: (i) multi-hop patterns are mostly generic to question answering over KGs; and (ii) across many KGs, analogous relations have semantic or lexical overlap. Therefore, the present invention focuses on 2 sub-tasks in this stage: query skeleton generation and partial relation linking. In an embodiment, the output of this stage is a softly-tied semantic parse, because the exact output is partially dependent on the specific KG in use, but the present invention's choice of representations and architecture ensures that transfer across KGs is a natural consequence.

KG alignment: This is the next step where the present invention introduces all vocabulary specific to the knowledge graph in order to generate an executable SPARQL query. To do so, the present invention binds the softy-tied semantic parse strongly to the KG to find the answer by (i) resolving the textual relations to KG relations, (ii) introducing KG specific entities into the SPARQL skeleton, and (iii) ranking the obtained SPARQL queries based on its groundings in the KG.

As mentioned above, the goal of the present invention is to create a representation and architecture that can generalize easily not only across examples within a dataset, but also across KGs. To accomplish this, the present invention defines two subtasks: (a) Skeleton Generation, and (b) Partial relation linking.

Skeleton Generation: A SPARQL's skeleton captures the operators needed to answer the question; i.e., ASK, SELECT, COUNT or FILTER, as well as the query graph structure, with placeholder nodes for entities (e.g., :ent0), relations (e.g., :prop0) and variables (e.g., ?var0). For many questions, the generated SPARQL skeletons across different KGs are similar, if not identical. The present invention structures the skeleton uniquely to a KG, e.g., reification, can be learnt when fine-tuning on a dataset with that underlying KG. An example of a SPARQL skeleton is demonstrated in FIG. 4 for the question "The films directed by John Director are in which language?".

As shown in FIG. 1, the present invention passes a question through a transformer based SEQ2SEQ model which is trained to produce the SPARQL skeleton corresponding to the question text. The encoder of the SEQ2SEQ model is a bi-direction transformer, while the decoder is auto-regressive with a causal self-attention mask.

Given a question text, the present invention tokenizes said text using bidirectional encoder representations from transformers (BERT) tokenizer and adding special "[CLS]" and "[SEP]" symbols in the beginning and the end of the question, respectively. Responsively, the present invention passes the tokenized input is through a transformer encoder, producing encoder hidden states for each token at each layer. The present invention initializes the encoder with pretrained BERT model, which helps generalization with respect to different question syntax.

Responsively, the present invention utilizes a transformer decoder with cross attention mechanism. At each time step i, the decoder considers the encoder states via cross-attention and previous decoder states via self-attention. The present invention then produces a distribution over possible skeleton output tokens. The decoder output vocabulary V comprises of entity place holder tokens $V_e$, relation place holder tokens $V_r$, and SPARQL operators $V_o$; each of these is a small, closed set of tokens. The output of each decoding step is a SoftMax over possible operators $s_i \in V$. Unlike the encoder, no pre-trained model is used for the decoder, and parameters are initialized randomly.

Partial Relation Linking: For each relation placeholder in the SPARQL skeleton (:prop0, :prop1, etc.), the present invention identifies the appropriate relation that can replace the place holder to produce the correct semantic representation of the query. The present invention notes that relations across KGs share lexical and semantic similarities. For example, in FIG. 3 the three KGs (DBpedia, Wikimovies, and Wikidata) represent the relationship "Directed by" with very similar lexical terms "Director" and "Directed by". The present invention thus leverages large pre-trained language models to allow generalization and transfer of such relations across KGs. In each KG, the present invention first maps the relations to respective surface forms, using either label relations from the KG, or by extracting some semantically meaningful surface form from the relation URI. These are the "textualized relations" shown in FIG. 4. FIG. 7 shows some more examples of relation labels for 3 KGs. In an embodiment, this mapping is many-to-one. For example, both dbo:language and dbp:language map to the same relation label "language".

The goal here is to identify which relation surface form best matches each relation placeholder in the skeleton. The present invention thus trains the SEQ2SEQ decoder and relation encoder to project into the same space. Concretely, the present invention optimizes the decoder hidden state corresponding to each relation placeholder to be closest to the encoded representation of the correct relation, using a cross-entropy loss. For example, in FIG. 4, the decoder state for :prop0 should have maximum inner product with the encoded representation for the relation surface form "Directed by", compared to the encoded representations of all other relations. The relation encoder of the present invention is a transformer model whose parameters are initialized with pretrained BERT model. Given that BERT-based representations of lexically or semantically similar relations across KGs will be close, it is easy to see why transfer across KG is possible. The final outcome of partial relation is the linking a ranked list of relation surface forms for each placeholder in the skeleton.

The present invention optimizes the skeleton generation loss and partial relation linking loss, jointly. The present invention utilizes the SPARQL skeleton together with the partial relation linking to produce a ranked list of softly-tied query sketches. In the case of multiple placeholders, the score of each pair of relation surface forms is the product of their individual scores. In some embodiments, this phase produces multiple semantic interpretations, either due to noisy surface forms (for instance, DBpedia KG includes Wikipedia infobox keys "as is" that cannot be mapped to the ontology relations) or due to the presence of semantically identical or similar relations with distinct identifiers (e.g., dbo:language and dbp:language). For the example, "The films directed by John Director are in which language?", this stage will produce the results demonstrated in FIG. 6.

In order to generate an executable SPARQL query, the present invention introduces vocabulary specific to the KG. The present invention utilizes a KG interaction stage to perform this task. Concretely, given a list of candidate query sketches, the present invention performs the following steps to produce the final question answer: 1) link the different entities to corresponding placeholders in the skeleton, 2) disambiguate relations' textual form and link it to the specific KG relations, and 3) select the correct SPARQL based on the actual facts in the KG.

The present invention leverages a pre-trained off-the-shelf entity linker (not depicted). The entity linker provides tuples of (surface form, linked entity) pairs. The entity placeholder resolution step aligns the entities with the entity place holders in the query sketch. In the example above, :ent0 will be linked to dbr:John_Director in DBpedia, or wd:Q313039 in Wikidata. Responsive to multiple entities are present in the question, program 150 defines the position of the corresponding textual span as the alignment to the entity placeholder variable. In another embodiment, during training, the first entity in the question corresponds to :ent0, the second entity by :ent1, etc. This pattern is repeated by the present invention when decoding during inference, making entity placeholder resolution trivial.

The next step is for the present invention to disambiguate relations' textual form and link them to the specific KG relations. FIG. 7 shows that each surface form in a query sketch can map to one or more KG relations. In the example using DBpedia as a KG, the surface form "director" could map to both [dbo:director, dbp:director] whereas "language" could map to both [dbo:language, dbp:language]. The semantic parsing stage cannot distinguish between these, and thus the present invention relies on the KG to determine the specific relation that should be chosen. Concretely, the present invention replaces every relation surface form with each of the possible KG relations it could map to. Thus, each softly-tied query sketch produces one or more fully executable SPARQLs. For example, the 2 softly-tied sketches from the previous stage and example produce 4 possible SPARQLs, see FIG. 8. As the final step, the present invention executes the candidate SPARQL queries against the KB and choose the highest-ranked SPARQL that produces an answer for SELECT queries. Since ASK queries do not necessarily have to be valid in the KG, the present invention only considers the model score in such cases.

In this section, the present invention compares STaG-QA (i.e., program 150) to other state-of-the-art approaches on datasets from multiple KGs. The present invention validates two claims: (1) STaG-QA achieves state-of-the-art or comparable performance on a variety of datasets and KGs and (2) STaG-QA generalizes across KBs, hence facilitating transfer. The results show that pre-training our system achieves improvement in performance with better gains in low-resource and unseen relation combination settings.

To evaluate generality, the present invention used datasets across a wide variety of KGs including Wikimovies-KG, Freebase, DBpedia, and Wikidata. In particular, the present invention used the following datasets (FIG. 9 shows detailed statistics for each dataset): (a) MetaQA is a large-scale complex-query answering dataset on a KG with 135 k triples, 43 k entities, and nine relations, containing more than 400K questions for both single and multi-hop reasoning; (b) WQSP-FB (Freebase) provides a subset of WebQuestions with semantic parses, with 4737 questions in total; and (c) LC-QuAD 1.0 (DBpedia) provides dataset with 5,000 questions (4,000 train and 1,000 test) based on templates. It includes simple, multi-hop, as well as aggregation-type questions. LC-QuAD 2.0 is another version of LC-QuAD based on Wikidata. It has 30K question in total and also template based. Due to the larger underlying KB and the extensive pattern covered, the present invention used LC-QuAD 2.0 dataset for pretraining and showing transfer results. (d) SimpleQuestions—Wiki (Wikidata)): a mapping of the popular Freebase's SimpleQuestions dataset toWikidata KB with 21K answerable questions.

The present invention evaluates against 8 different KBQA systems categorized into unsupervised and supervised approaches: 1) NSQA is state-of-the-art system for KBQA on DBpedia datasets; 2) QAMP is an unsupervised message passing approach that provides competitive performance on LC-QuAD 1.0 dataset; (3) WDAqua is another system that generalizes well across a variety of knowledge graphs; and Falcon 2.0 is a heuristics-based approach for joint detection of entities and relations in Wikidata. Since this approach does not predict the query structure, the present invention tested it on SimpleQuestions dataset only; (5) EmbedKGQA is the state-of-the-art KBQA system on MetaQA and WebQSP datasets; (6) PullNet is recent approach evaluated on MetaQA and WebQSP datasets; (7) GraftNet infuses both text and KG into a heterogeneous graph and uses graph convolutional networks (GCN) for question answering; and (8) EmQL is a query embedding approach that was successfully integrated into a KBQA system and evaluated on WebQSP and MetaQA datasets.

FIG. 11 shows present invention results on all four datasets in comparison to existing approaches. FIG. 11 depicts two embodiments of the present invention, one pre-trained with LC-QuAD 2.0 dataset (STaG-QA$_{pre}$) and another trained from scratch on the target dataset only (STaG-QA). The present invention is first to show generality across knowledge graphs by evaluating on datasets from DBpedia, Wikidata, Freebase, and Wikimovies-KG. The present invention achieves significantly better performance compared to Falcon 2.0 on SimpleQuestions-Wiki dataset with 24% better F1 score. While Falcon 2.0 is not a KBQA system itself, it jointly predicts entities and relations given a question. Since SimpleQuestions-Wiki requires only a single entity and a single relation, the present invention used Falcon 2.0 output to generate the corresponding SPARQL query required for KBQA evaluation. On MetaQA dataset, the present invention as well as the baselines achieve near perfect scores indicating the simplicity of this dataset.

On LC-QuAD 1.0, the present invention significantly outperforms existing DBpedia-based approaches. When pre-trained on LC-QuAD 2.0, the performance is 9% better F1 compared to NSQA; the state-of-the-art system on DBpedia. The large improvement indicates that STaG-QA was able to generalize and learn similar patterns between LC-QuAD 1.0 and LC-QuAD 2.0. Overall, the results show that STaG-QA shows better or competitive performance on three out of four datasets and when pretrained on another dataset, the performance improves across all datasets. Below, the present invention analyzes different datasets in terms of the degree of challenge posed for KBQA systems. The present invention proposes evaluation splits that will allow better system discrimination in terms of performance on these datasets.

Figure 10A:
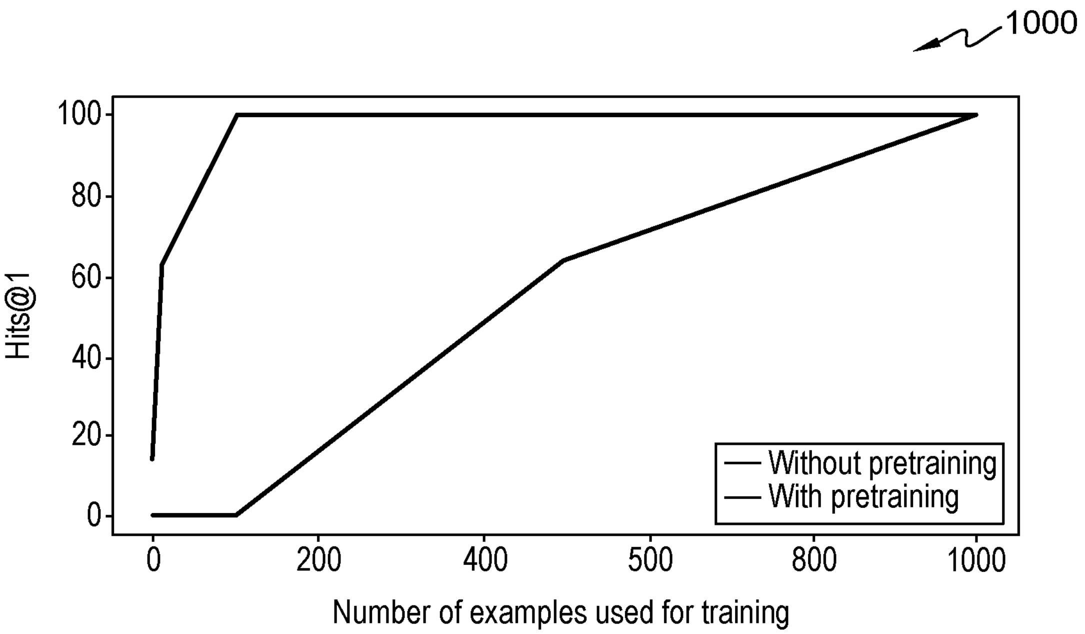
FIGS. 10A and 10B are charts containing system performance results, in accordance with an embodiment of the present invention.
Figure 10B:
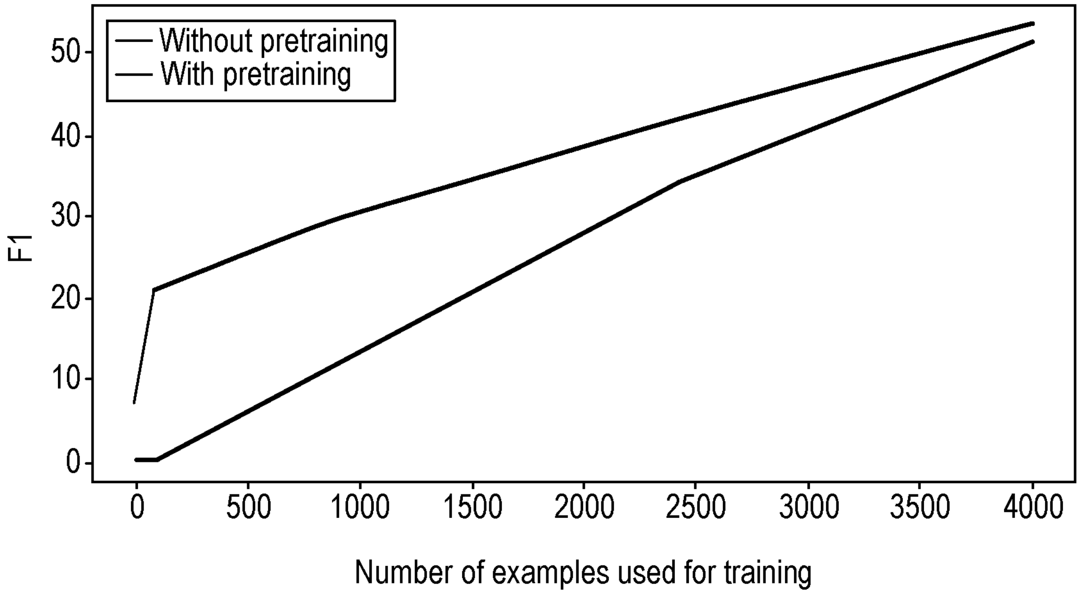

The present invention is designed to allow transfer learning between entirely different QA dataset/KG pairs. As it is harder to show improvements with pre-training on larger datasets, the present invention considers low-resource settings to demonstrate the benefit of transfer, even across KGs. This is useful when there is scarcity of training data for a new target KG. The present invention investigates the benefit of pretraining the semantic parsing stage using LC-QuaD 2.0 (Wikidata KG), before training on the 2-hop dataset in MetaQA (MetaQA-KG) and the LC-QuAD 1.0 dataset (DBpedia). FIGS. 10A and 10B show the performance of STaG-QA on each dataset with and without pre-training. In an embodiment, without any fine-tuning on either datasets, the pre-trained version STaG-QApre was able to achieve 18% Hits@ 1 on MetaQA and 8% F1 on LC-QuAD 1.0, indicating the model ability to do zero-shot transfer across knowledge graphs. In an embodiment, the pre-trained version provides better performance and is able to converge much faster. For example, in MetaQA (FIG. 10A), STaG-QA$_{pre}$ was able to reach almost 100% Hits@ 1 with 100 training examples only. To reach the same 100% Hits@ 1, STaG-QA without pretraining required 1,000 examples, an order of magnitude more training data. The same behavior can be observed on LC-QuAD 1.0, where STaGQA$_{pre}$ is better than STaG-QA, but with both embodiments continuing to improve as more training data becomes available.

Common KBs have a large number of relations. For example, DBpedia has approximately 60K relations, Wikidata has approximately 8K relations, whereas Freebase contains approximately 25K relations. In multi-hop queries, these relations can be arranged as paths (e.g., director ! language) where possible path combinations grow combinatorically. With learning-based approaches, seeing all or most possible relation combinations at training would indeed result in performance improvement at the testing phase. However, this is impractical and hard to enforce in practical scenarios with most KBs as it would require significantly large training data to cover all combinations. Instead, an effective KBQA system should be able to generalize to unseen relation paths. In this section, the present invention first analyzes existing KBQA datasets to see to which extent this ability is being tested currently. The present invention then creates a development set specifically for testing the ability of KBQA systems to generalize to unseen multi-hop relation paths.

FIG. 12 shows the number of test questions in LCQuAD 1.0, MetaQA and WebQSP datasets that contain relation combinations never seen at training. For instance, MetaQA does not test for any unseen relation paths (0%) where WebQSP contains only 2.06% of such questions. In contrast, in LC-QuAD 1.0 roughly half of the test questions contain novel relation compositions.

MetaQA Unseen Challenge Set: In order to further investigate how this issue affects current KBQA systems, the present invention created a subset from MetaQA, the largest dataset in FIG. 13 and yet having no unseen relation combinations at testing. The present invention modified the train and dev sets of MetaQA as follows: From the 2-hop training set, the present invention removed training examples containing two randomly chosen relation paths (actor_to_movie_to_director and director_to_movie_to_actor) and split the dev set into two, one containing 13,510 questions with all seen relations path in training and another containing 1,361 questions with all unseen relation paths. In an embodiment, for each of the unseen relation combinations, the individual relations are present in the training set, i.e., this experiment is designed to test compositionality rather than zero-shot relation linking ability.

The present invention trained STaG-QA (i.e., program 150), EmbedKGQA and GraftNet on the new reduced training set and tested the performance on our new development sets (seen and unseen). FIG. 13 shows the results for each system on 2-hop questions on seen relation paths vs unseen ones. The results clearly demonstrate that there is a significant drop in performance in methods that rank directly across entities in the KG to predict answers. This is most clearly observed in EmbedKGQA, as well as GraftNet-KB, though the use of text (GraftNet-Text and GraftNet-Both) does alleviate this issue. In contrast, the present invention is able to maintain exactly the same level of performance for novel relation compositions using KB information alone.

There have been a wide variety of Knowledge Base Question Answering (KBQA) systems trained on datasets that are either question-SPARQL pairs (strong supervision) or question-answer pairs (weak supervision). More generally, the former can use any logical form that expresses the question as an RDF-query, which is then run on the KG to retrieve the answer.

As mentioned above, the first category of KBQA approaches focus on translating the natural language questions into an intermediate logical form to retrieve results from the knowledge base. Generating this kind of semantic parse of the question has shown improved performance compared to weak-supervision based approaches. Furthermore, the intermediate structured representation of the question provides a level of interpretability and explanation that is absent in systems that directly rank over entities in the KG to produce answers. This category can further be classified into rule-based approaches. Rule based approaches primarily depend on generic language based syntactic or semantic parses of the question and build rules to obtain a query graph that represents the SPARQL query. NSQA, the state-of-the-art approach for DBpedia based datasets such as LC-QuAD-1.0 and QALD-9, falls in this category. The system uses Abstract Meaning Representation (AMR) parses of the question and a heuristic-based graph-driven methodology to transform the AMR graph to a query graph that represents the SPARQL query. Many of these systems have components or aspects that are specific to the KG they evaluate on, and do not trivially generalize to other KGs. In particular GAnswer, NSQA, and QAmp are specific to DBpedia and do not evaluate respective approaches on any other KGs.

On the other hand, MaSP is a multi-task end-to-end learning approach that focuses of dialog-based KGQA setup. MaSP uses a predicate classifier which makes transfer across KGs non-trivial. The present invention adapts to be generalizable across KGs by replacing the relation classifier with a BERT-based ranker that leverages similarities in label semantics between KGs. In an embodiment, the present invention has a ranking based approach that is heavily dependent on the knowledge graph. In this embodiment, the present invention ranks all candidate graph patterns retrieved from the knowledge graph based on the grounded entity. In multi-hop settings, as in MetaQA with 3-hop questions, retrieving all possible candidates up to n-hops (for an arbitrary choice of n) and then ranking across is computationally expensive. In contrast, the present invention focuses on a generative approach to modeling query graph patterns.

The present invention demonstrates that a 2-stage architecture which explicitly separates the KG-agnostic semantic parsing stage from the KG-specific interaction can generalize across a range of datasets and KGs. The present invention is evaluated on four different KG/QA pairs, obtaining state-of-the-art performance on MetaQA, LC-QuAD 1.0, and SimpleQuestions-Wiki; as well as competitive performance on WebQSP. Furthermore, the present invention successfully demonstrates transfer learning across KGs by showing that pretraining the semantic parsing stage on an existing KG/QA dataset pair can help improve performance in low-resource settings for a new target KG; as well as greatly reduce the number of examples required to achieve state-of-the-art performance. Finally, the present invention shows that some popular benchmark datasets do not evaluate generalization to unseen combinations of seen relations (compositionality), an important requirement for a question answering system.

FIG. 3 depicts table 300, in accordance with an illustrative embodiment of the present invention. Table 300 contains a plurality of an exemplary query sketches for the question "The films directed by John Director are in which language?" over a set of KGs.

FIG. 4 depicts SPARQL Protocol and RDF Query Language (SPARQL) skeleton 400, in accordance with an illustrative embodiment of the present invention. SPARQL skeleton 400 is an exemplary SPARQL skeleton for the question "The films directed by John Director are in which language?".

FIG. 5 depicts exemplary workflow 500, in accordance with an illustrative embodiment of the present invention. Exemplary workflow 500 contains a two-stage system architecture that comprised of softly-tied semantic parse generation that takes an input question returns a KG-agnostic parse, and a knowledge graph integration process to return the SPARQL query.

FIG. 6 depicts SPARQL sketch 600, in accordance with an illustrative embodiment of the present invention. SPARQL sketch 600 is an exemplary SPARQL for the question "The films directed by John Director are in which language?" with corresponding probabilities.

FIG. 7 depicts table 700, in accordance with an illustrative embodiment of the present invention. Table 700 contains examples of textualized relations for different KGs, obtained either using the relation label from the KG (DBpedia, Wikidata) or by extracting a part of the relation URI (Freebase). FIG. 7 shows that each surface form in a query sketch can map to one or more KG relations.

FIG. 8 depicts table 800, in accordance with an illustrative embodiment of the present invention. Table 800 contains top predicted SPARQL queries for the question "The films directed by John Director are in which language?".

FIG. 9 depicts table 900, in accordance with an illustrative embodiment of the present invention. Table 900 contains dataset statistics corresponding to each dataset in each KG utilized for experimentation by the present invention.

FIGS. 10A and 10B depict charts 1000, in accordance with an illustrative embodiment of the present invention. Charts 1000 contain system performance results. FIG. 10A demonstrates system performance on MetaQA 2-hop questions using different number of training examples, with and without pretraining on LC-QuAD 2.0. FIG. 10B demonstrates system performance on LC-QuAD 1.0 using different number of training examples, with and without pretraining on LC-QuAD 2.0. FIGS. 10A and 10B show the performance of STaG-QA on each dataset with and without pre-training. Charts 1000 shows that without any fine-tuning on either dataset, the pre-trained version STaG-$QA_{pre}$ was able to achieve 18% Hits@ 1 on MetaQA and 8% F1 on LC-QuAD 1.0, indicating the model ability to do zero-shot transfer across knowledge graphs. In an embodiment, the pre-trained version provides better performance and is able to converge much faster. For example, in MetaQA (FIG. 10A), STaG-$QA_{pre}$ was able to reach almost 100% Hits@ 1 with 100 training examples only. To reach the same 100% Hits@ 1, STaG-QA without pretraining required 1,000 examples, an order of magnitude more training data. The same behavior can be observed on LC-QuAD 1.0, where STaG-$QA_{pre}$ is better than STaG-QA, but with both embodiments continuing to improve as more training data becomes available.

FIG. 11 depicts table 1100, in accordance with an illustrative embodiment of the present invention. Table 1100 contains performance results against previous state-of-the-art approaches. Following these techniques, table 1100 contains reported precision, recall and F1 scores on SimpleQuestions and LC-QuAD 1.0, and Hits@ 1 performance on WebQSP and MetaQA datasets. The subscript "pre" indicates the "pre-trained" version of our system using LC-QuAD 2.0 dataset. FIG. 11 depicts two embodiments of the present invention, one pre-trained with LC-QuAD 2.0 dataset (STaG-$QA_{pre}$) and another trained from scratch on the target dataset only (STaG-QA). The present invention is first to show generality across knowledge graphs by evaluating on datasets from DBpedia, Wikidata, Freebase, and Wikimovies-KG. The present invention achieves significantly better performance compared to Falcon 2.0 on SimpleQuestions-Wiki dataset with 24% better F1 score. While Falcon 2.0 is not a KBQA system itself, it jointly predicts entities and relations given a question. Since SimpleQuestions-Wiki requires only a single entity and a single relation, the present invention used Falcon 2.0 output to generate the corresponding SPARQL query required for KBQA evaluation. On MetaQA dataset, the present invention as well as the baselines achieve near perfect scores indicating the simplicity of this dataset.

FIG. 12 depicts table 1200, in accordance with an illustrative embodiment of the present invention. Table 1200 contains unseen path combinations of seen relations comprising the number of test questions in LCQuAD 1.0, MetaQA and WebQSP datasets that contain relation combinations never seen at training. For instance, MetaQA does not test for any unseen relation paths (0%) where WebQSP contains only 2.06% of such questions. In contrast, in LC-QuAD 1.0 roughly half of the test questions contain novel relation compositions.

FIG. 13 depicts table 1300, in accordance with an illustrative embodiment of the present invention. Table 1300 contains MetaQA (i.e., movie ontology) unseen challenge set setting results for each system on 2-hop questions on seen relation paths vs unseen ones. The results clearly demonstrate that there is a significant drop in performance in methods that rank directly across entities in the KG to predict answers.

Figure 14:
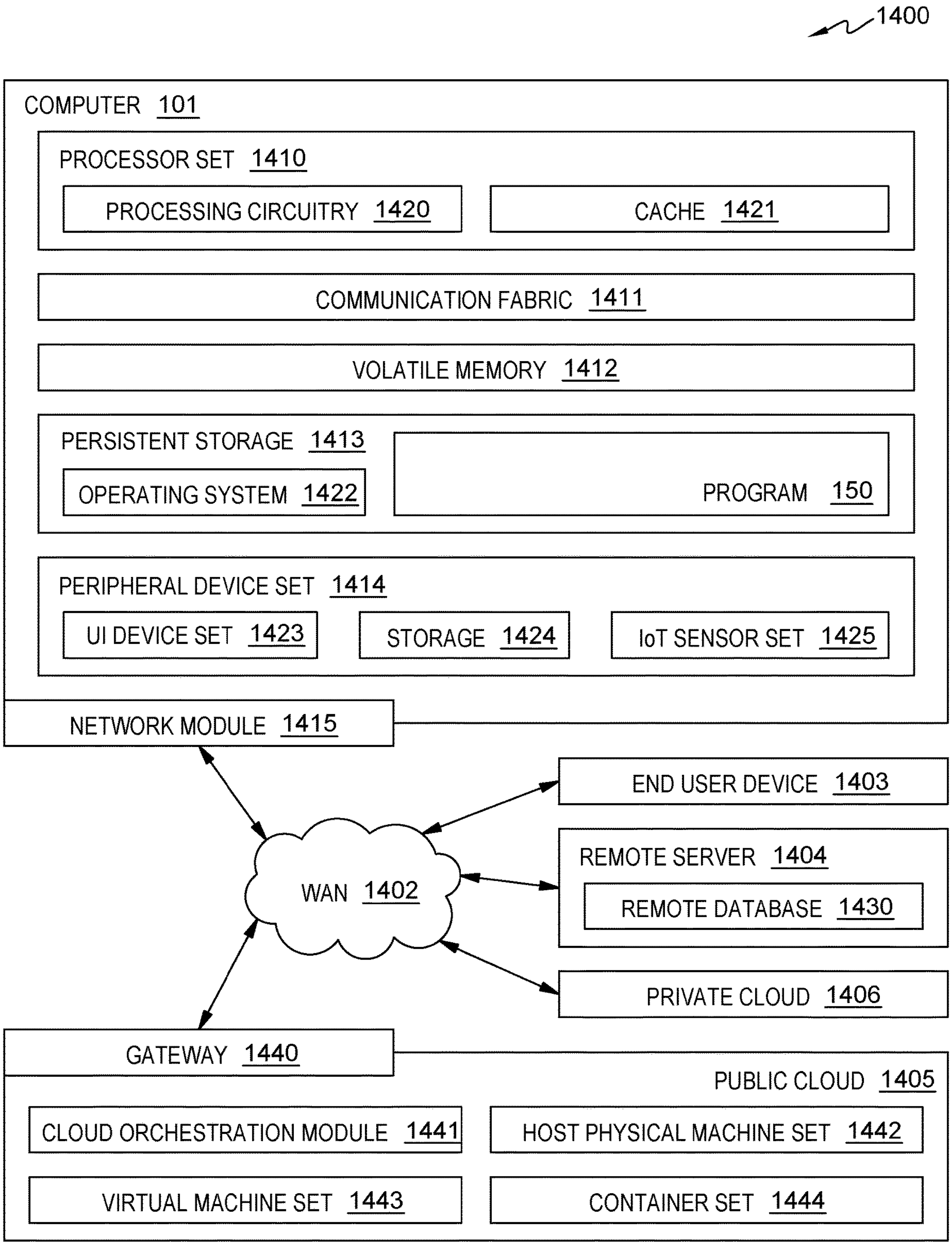
FIG. 14 is a block diagram of components of the computer, in accordance with an embodiment of the present invention.

FIG. 14 depicts block diagram 1400 illustrating components of computer 101 in accordance with an illustrative embodiment of the present invention. It should be appreciated that FIG. 14 provides only an illustration of one implementation and does not imply any limitations with regard to the environments in which different embodiments may be implemented. Many modifications to the depicted environment may be made.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, defragmentation, or garbage collection, but this does not render the storage device as transitory because the data is not transitory while it is stored.

Computing environment 100 contains an example of an environment for the execution of at least some of the computer code involved in performing the inventive methods, such as program 150. In addition to program 150, computing environment 100 includes, for example, computer 101, wide area network (WAN) 1402, end user device (EUD) 1403, remote server 1404, public cloud 1405, and private cloud 1406. In this embodiment, computer 101 includes processor set 1410 (including processing circuitry 1420 and cache 1421), communication fabric 1411, volatile memory 1412, persistent storage 1413 (including operating system 1422 and program 150, as identified above), peripheral device set 1414 (including user interface (UI), device set 1423, storage 1424, and Internet of Things (IoT) sensor set 1425), and network module 1415. Remote server 1404 includes remote database 1430. Public cloud 1405 includes gateway 1440, cloud orchestration module 1441, host physical machine set 1442, virtual machine set 1443, and container set 1444.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 1430. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 14. On the other hand, computer 101 is not required to be in a cloud except to any extent as may be affirmatively indicated.

Processor set 1410 includes one, or more, computer processors of any type now known or to be developed in the future. Processing circuitry 1420 may be distributed over multiple packages, for example, multiple, coordinated integrated circuit chips. Processing circuitry 1420 may implement multiple processor threads and/or multiple processor cores. Cache 1421 is memory that is located in the processor chip package(s) and is typically used for data or code that should be available for rapid access by the threads or cores running on processor set 1410. Cache memories are typically organized into multiple levels depending upon relative proximity to the processing circuitry. Alternatively, some, or all, of the cache for the processor set may be located "off chip". In some computing environments, processor set 1410 may be designed for working with qubits and performing quantum computing.

Computer readable program instructions are typically loaded onto computer 101 to cause a series of operational steps to be performed by processor set 1410 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1421 and the other storage media discussed below. The program instructions, and associated data, are accessed by processor set 1410 to control and direct performance of the inventive methods. In computing environment 100, at least some of the instructions for performing the inventive methods may be stored in program 150 in persistent storage 1413.

Communication fabric 1411 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 1412 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 1412 is located in a single package and is internal to computer 101, but, alternatively or additionally, the volatile memory may be distributed over multiple packages and/or located externally with respect to computer 101.

Persistent storage 1413 is any form of non-volatile storage for computers that is now known or to be developed in the future. The non-volatility of this storage means that the stored data is maintained regardless of whether power is being supplied to computer 101 and/or directly to persistent storage 1413. Persistent storage 1413 may be a read only memory (ROM), but typically at least a portion of the persistent storage allows writing of data, deletion of data and re-writing of data. Some familiar forms of persistent storage include magnetic disks and solid-state storage devices. Operating system 1422 may take several forms, such as various known proprietary operating systems or open-source Portable Operating System Interface type operating systems that employ a kernel. The code included in program 150 typically includes at least some of the computer code involved in performing the inventive methods.

Peripheral device set 1414 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1423 may include components such as a display screen, speaker, microphone, wearable devices (such as goggles and smart watches), keyboard, mouse, printer, touchpad, game controllers, and haptic devices. Storage 1424 is external storage, such as an external hard drive, or insertable storage, such as an SD card. Storage 1424 may be persistent and/or volatile. In some embodiments, storage 1424 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 1425 is made up of sensors that can be used in Internet of Things applications. For example, one sensor may be a thermometer and another sensor may be a motion detector.

Network module 1415 is the collection of computer software, hardware, and firmware that allows computer 101 to communicate with other computers through WAN 1402. Network module 1415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1415 are performed on the same physical hardware device. In other embodiments (for example, embodiments that utilize software-defined networking (SDN)), the control functions and the forwarding functions of network module 1415 are performed on physically separate devices, such that the control functions manage several different network hardware devices. Computer readable program instructions for performing the inventive methods can typically be downloaded to computer 101 from an external computer or external storage device through a network adapter card or network interface included in network module 1415.

WAN 1402 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 1403 is any computer system that is used and controlled by an end user (for example, a customer of an enterprise that operates computer 101) and may take any of the forms discussed above in connection with computer 101. EUD 1403 typically receives helpful and useful data from the operations of computer 101. For example, in a hypothetical case where computer 101 is designed to provide a recommendation to an end user, this recommendation would typically be communicated from network module 1415 of computer 101 through WAN 1402 to EUD 1403. In this way, EUD 1403 can display, or otherwise present, the recommendation to an end user. In some embodiments, EUD 1403 may be a client device, such as thin client, heavy client, mainframe computer, desktop computer and so on.

Remote server 1404 is any computer system that serves at least some data and/or functionality to computer 101. Remote server 1404 may be controlled and used by the same entity that operates computer 101. Remote server 1404 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 1430 of remote server 1404.

Public cloud 1405 is any computer system available for use by multiple entities that provides on-demand availability of computer system resources and/or other computer capabilities, especially data storage (cloud storage) and computing power, without direct active management by the user.

Cloud computing typically leverages sharing of resources to achieve coherence and economies of scale. The direct and active management of the computing resources of public cloud 1405 is performed by the computer hardware and/or software of cloud orchestration module 1441. The computing resources provided by public cloud 1405 are typically implemented by virtual computing environments that run on various computers making up the computers of host physical machine set 1442, which is the universe of physical computers in and/or available to public cloud 1405. The virtual computing environments (VCEs) typically take the form of virtual machines from virtual machine set 1443 and/or containers from container set 1444. It is understood that these VCEs may be stored as images and may be transferred among and between the various physical machine hosts, either as images or after instantiation of the VCE. Cloud orchestration module 1441 manages the transfer and storage of images, deploys new instantiations of VCEs and manages active instantiations of VCE deployments. Gateway 1440 is the collection of computer software, hardware, and firmware that allows public cloud 1405 to communicate through WAN 1402.

Some further explanation of virtualized computing environments (VCEs) will now be provided. VCEs can be stored as "images". A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 1406 is similar to public cloud 1405, except that the computing resources are only available for use by a single enterprise. While private cloud 1406 is depicted as being in communication with WAN 1402, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1405 and private cloud 1406 are both part of a larger hybrid cloud.

What is claimed is:

1. A computer-implemented method comprising:

improving, by one or more computer processors, knowledge base question answering (KBQA) model convergence and prediction performance by generalizing the KBQA model based on transfer learning, comprising:

generating, by one or more computer processors, a query graph skeleton, utilizing a model, based on a received question, wherein the model comprises an auto-regressive decoder with a casual self-attention mask and an encoder comprising a bi-direction transformer, and wherein generating the query graph skeleton further comprises:

tokenizing, by one or more computer processors, text associated with the received question using bi-directional encoder representations from the encoder;

producing, by one or more computer processors, encoder hidden states for each token at each layer of the model; and producing, by one or more computer processors, a distribution over skeleton output tokens utilizing the decoder at each time step to consider the encoder hidden states via cross-attention and previous decoder states via self-attention, wherein the output of each decoding step is a SoftMax over a set of operators comprising entity placeholder tokens, relation placeholder tokens, and SPARQL Protocol and RDF Query Language (SPARQL) operators of a closed decoder output vocabulary;

partial relation linking, by one or more computer processors, each relation placeholder comprised within the generated skeleton to one or more respective relation surface forms by encoding candidate relation surface forms with a relation encoder initialized with a pretrained bidirectional encoder model and jointly optimizing skeleton generation loss and partial relation linking loss such that a decoder hidden state corresponding to a relation placeholder is projected closest to an encoded representation of a correct relation surface form;

responsive to a received natural language question for a target knowledge graph (KG), producing, by one or more computer processors, one or more softly-tied query sketches utilizing the generated skeleton with the partial relation linking;

producing, by one or more computer processors, one or more executable queries for each softly-tied query sketch;

executing, by one or more computer processors, the one or more produced executable queries against a knowledge base; and selecting a highest-ranked executable query that produces an answer for a selection query.

2. The computer-implemented method of claim 1, wherein improving the KBQA model convergence and prediction performance by generalizing the KBQA model based on transfer learning, comprises:

aligning, by one or more computer processors, the one or more softly-tied query sketches to the target KG.

3. The computer-implemented method of claim 2, further comprising:

providing, by one or more computer processors, a result, associated with the one or more executable queries, to a user.

4. The computer-implemented method of claim 2, wherein the aligning the one or more softly-tied query sketches to the KG, comprises:

linking, by one or more computer processors, one or more entities to each entity placeholder node comprised within the generated skeleton; and disambiguating, by one or more computer processors, one or more relations, in a textual form, and linking the one or more disambiguated relations to one or more KG relations.

5. The computer-implemented method of claim 2, further comprising:

executing, by one or more computer processors, the one or more produced executable queries against a knowledge base to retrieve one or more answers.

6. The computer-implemented method of claim 1, wherein partial relation linking each relation placeholder comprised within the generated skeleton to the respective relation surface form, comprises:

identifying, by one or more computer processors, a KG relation to replace the relation placeholder in order to produce a correct semantic representation of a softly-tied query.

7. The computer-implemented method of claim 4, wherein disambiguating one or more relations, in the textual form and linking the one or more disambiguated relations to the one or more KG relations, comprises:

replacing, by one or more computer processors, every relation surface form with each possible KG relation.

8. The computer-implemented method of claim 4, further comprising:

responsive to multiple entities, defining, by one or more computer processors, a position of a corresponding textual span as an alignment to a corresponding entity placeholder.

9. The computer-implemented method of claim 4, further comprising:

jointly optimizing, by one or more computer processors, skeleton generation loss and partial relation linking loss.

10. A computer program product comprising:

one or more computer-readable storage media; and program instructions stored on the one or more computer-readable storage media to perform operations comprising:

improving knowledge base question answering (KBQA) model convergence and prediction performance by generalizing the KBQA model based on transfer learning, comprising:

generating a query graph skeleton, utilizing a model, based on a received question, wherein the model comprises an auto-regressive decoder with a casual self-attention mask and an encoder comprising a bi-direction transformer, and wherein generating the query graph skeleton further comprises:

tokenizing text associated with the received question using bi-directional encoder representations from the encoder;

producing encoder hidden states for each token at each layer of the model; and producing a distribution over skeleton output tokens utilizing the decoder at each time step to consider the encoder hidden states via cross-attention and previous decoder states via self-attention, wherein an output of each decoding step is a SoftMax over a set of operators comprising entity placeholder tokens, relation placeholder tokens, and SPARQL Protocol and RDF Query Language (SPARQL) operators of a closed decoder output vocabulary;

partial relation linking each relation placeholder comprised within the generated skeleton to one or more respective relation surface forms by encoding candidate relation surface forms with a relation encoder initialized with a pretrained bidirectional encoder model and jointly optimizing skeleton generation loss and partial relation linking loss such that a decoder hidden state corresponding to a relation placeholder is projected closest to an encoded representation of a correct relation surface form;

responsive to a received natural language question for a target knowledge graph (KG), producing one or more softly-tied query sketches utilizing the generated skeleton with the partial relation linking;

producing one or more executable queries for each softly-tied query sketch;

executing the one or more produced executable queries against a knowledge base; and selecting a highest-ranked executable query that produces an answer for a selection query.

11. The computer program product of claim 10, wherein the improving the KBQA model convergence and prediction performance by generalizing the KBQA model based on transfer learning further comprises:

aligning the one or more softly-tied query sketches to the target KG.

12. The computer program product of claim 11, wherein the operations further comprise:

providing a result, associated with the one or more executable queries, to a user.

13. A computer system comprising:

a processor set;

one or more computer-readable storage media; and program instructions stored on the one or more computer-readable storage media to cause the processor set to perform operations comprising:

improving knowledge base question answering (KBQA) model convergence and prediction performance by generalizing the KBQA model based on transfer learning, comprising:

generating a query graph skeleton, utilizing a model, based on a received question, wherein the model comprises an auto-regressive decoder with a casual self-attention mask and an encoder comprising a bi-direction transformer, and wherein generating the query graph skeleton further comprises:

tokenizing text associated with the received question using bi-directional encoder representations from the encoder;

producing encoder hidden states for each token at each layer of the model; and producing a distribution over skeleton output tokens utilizing the decoder at each time step to consider the encoder hidden states via cross-attention and previous decoder states via self-attention, wherein the output of each decoding step is a SoftMax over a set of operators comprising entity placeholder tokens, relation placeholder tokens, and SPARQL Protocol and RDF Query Language (SPARQL) operators of a closed decoder output vocabulary;

partial relation linking each relation placeholder comprised within the generated skeleton to one or more respective relation surface forms by encoding candidate relation surface forms with a relation encoder initialized with a pretrained bidirectional encoder model and jointly optimizing skeleton generation loss and partial relation linking loss such that a decoder hidden state corresponding to a relation placeholder is projected closest to an encoded representation of a correct relation surface form;

responsive to a received natural language question for a target knowledge graph (KG), producing one or more softly-tied query sketches utilizing the generated skeleton with the partial relation linking;

producing one or more executable queries for each softly-tied query sketch;

executing the one or more produced executable queries against a knowledge base; and selecting a highest-ranked executable query that produces an answer for a selection query.

14. The computer system of claim 13, wherein the improving the KBQA model convergence and prediction performance by generalizing the KBQA model based on transfer learning further comprises:

aligning the one or more softly-tied query sketches to the target KG.

15. The computer system of claim 14, wherein the operations further comprise:

providing a result, associated with the one or more executable queries, to a user.

16. The computer system of claim 14, wherein the aligning the one or more softly-tied query sketches to the KG comprises:

linking one or more entities to each entity placeholder node comprised within the generated skeleton; and disambiguating one or more relations, in a textual form, and linking the one or more disambiguated relations to one or more KG relations.

17. The computer system of claim 14, wherein the operations further comprise:

executing the one or more produced executable queries against a knowledge base to retrieve one or more answers.

* * * * *